US009082096B2

(12) United States Patent
Parameswaran et al.

(10) Patent No.: US 9,082,096 B2
(45) Date of Patent: Jul. 14, 2015

(54) ENHANCED PAYMENTS FOR SHIPPING

(75) Inventors: Sathiyan Parameswaran, Morrisplains, NJ (US); Bruce Besserer, Old Tappan, NJ (US); Nicholas Costides, Alpharetta, GA (US); Mark Hilbush, Roseland, NJ (US)

(73) Assignee: United Parcel Service of America, Inc., Atlanta, GA (US)

(*) Notice: Subject to any disclaimer, the term of this patent is extended or adjusted under 35 U.S.C. 154(b) by 78 days.

(21) Appl. No.: 12/813,998

(22) Filed: Jun. 11, 2010

(65) Prior Publication Data

US 2011/0307361 A1 Dec. 15, 2011

Related U.S. Application Data

(63) Continuation of application No. 12/813,096, filed on Jun. 10, 2010.

(51) Int. Cl.
| | | |
|---|---|---|
| *G06Q 20/00* | (2012.01) | |
| *G06Q 10/08* | (2012.01) | |
| *G06Q 30/04* | (2012.01) | |
| *G06Q 40/00* | (2012.01) | |
| G06Q 30/00 | (2012.01) | |
| G06F 7/00 | (2006.01) | |

(52) U.S. Cl.
CPC .............. *G06Q 10/08* (2013.01); *G06Q 10/083* (2013.01); *G06Q 10/0833* (2013.01); *G06Q 30/0185* (2013.01); *G06Q 30/04* (2013.01); *G06Q 40/12* (2013.12)

(58) Field of Classification Search
CPC ... G06Q 10/083; G06Q 20/32; G06Q 20/322; G06Q 20/325
See application file for complete search history.

(56) References Cited

U.S. PATENT DOCUMENTS

| | | | |
|---|---|---|---|
| 5,774,053 | A | 6/1998 | Porter |
| 5,979,750 | A | 11/1999 | Kindell |
| 6,010,064 | A | 1/2000 | Umeda et al. |
| 6,028,517 | A | 2/2000 | Sansone et al. |
| 6,085,170 | A | 7/2000 | Tsukuda |
| 6,323,782 | B1 | 11/2001 | Stephens et al. |

(Continued)

FOREIGN PATENT DOCUMENTS

| | | |
|---|---|---|
| DE | 10131304 A1 | 1/2003 |
| WO | WO 03/083784 A1 | 10/2003 |

OTHER PUBLICATIONS

Office Action dated Jan. 6, 2012, from U.S. Appl. No. 12/813,096.

(Continued)

*Primary Examiner* — Florian Zeender
*Assistant Examiner* — Dana Amsdell
(74) *Attorney, Agent, or Firm* — Alston & Bird LLP

(57) ABSTRACT

Systems, methods, apparatus, and computer program products are provided for initiating shipment of and payment for shipping a parcel. For example, in one embodiment, a customer/user can receive a message on a user device from a carrier that includes an authorization code for shipping a parcel. After the customer/user ships the parcel, the carrier can charge a variety of accounts for the shipping charges, including a wireless services provider associated with the user device. In another embodiment, the customer/user can interact with a kiosk to ship the parcel. In this embodiment, the carrier can also charge a variety of accounts for the shipping charges, including a wireless services provider.

16 Claims, 7 Drawing Sheets

(56) References Cited

U.S. PATENT DOCUMENTS

| | | | |
|---|---|---|---|
| 6,344,796 B1 | 2/2002 | Ogilvie et al. | |
| 6,456,900 B1 | 9/2002 | Kakuta | |
| 6,480,758 B2 | 11/2002 | Stevens | |
| 6,570,488 B2 | 5/2003 | Kucharczyk et al. | |
| 6,595,342 B1 | 7/2003 | Maritzen et al. | |
| 6,612,489 B2 | 9/2003 | McCormick et al. | |
| 6,688,435 B1 | 2/2004 | Will | |
| 6,690,997 B2 | 2/2004 | Rivalto | |
| 6,694,217 B2 | 2/2004 | Bloom | |
| 6,725,127 B2 | 4/2004 | Stevens | |
| 6,748,295 B2 | 6/2004 | Tilles et al. | |
| 6,756,879 B2 | 6/2004 | Shuster | |
| 6,791,450 B2 | 9/2004 | Gokcebay et al. | |
| 6,820,805 B2 | 11/2004 | Stevens | |
| 6,845,909 B2 | 1/2005 | Bong et al. | |
| 6,862,576 B1 | 3/2005 | Turner et al. | |
| 6,882,269 B2 | 4/2005 | Moreno | |
| 6,933,832 B1 | 8/2005 | Simms | |
| 6,950,803 B2 | 9/2005 | Tiley | |
| 6,961,711 B1 | 11/2005 | Chee | |
| 6,967,575 B1 | 11/2005 | Dohrmann et al. | |
| 6,974,928 B2 | 12/2005 | Bloom | |
| 7,055,741 B2 | 6/2006 | Bong et al. | |
| 7,062,471 B1 * | 6/2006 | Matsuyama et al. | 705/65 |
| 7,068,149 B2 | 6/2006 | Lee et al. | |
| 7,075,451 B2 | 7/2006 | Yamada | |
| 7,110,958 B2 | 9/2006 | Yang | |
| 7,133,743 B2 | 11/2006 | Tilles et al. | |
| 7,158,941 B1 | 1/2007 | Thompson | |
| 7,337,944 B2 | 3/2008 | Devar | |
| 7,647,249 B2 * | 1/2010 | Shroff et al. | 705/26.3 |
| 7,653,457 B2 | 1/2010 | Bloom | |
| 7,653,603 B1 | 1/2010 | Holtkamp, Jr. | |
| 7,769,633 B2 | 8/2010 | Jokinen et al. | |
| 7,815,112 B2 | 10/2010 | Volpe et al. | |
| 7,822,618 B2 | 10/2010 | Kaneko | |
| 8,010,462 B2 | 8/2011 | Kinory et al. | |
| 2001/0040422 A1 | 11/2001 | Gramlich | |
| 2001/0049636 A1 | 12/2001 | Hudda | |
| 2002/0016726 A1 | 2/2002 | Ross | |
| 2002/0032613 A1 | 3/2002 | Buettgenbach et al. | |
| 2002/0035515 A1 * | 3/2002 | Moreno | 705/26 |
| 2002/0103724 A1 | 8/2002 | Huxter | |
| 2002/0107820 A1 | 8/2002 | Huxter | |
| 2002/0147919 A1 | 10/2002 | Gentry | |
| 2002/0156645 A1 * | 10/2002 | Hansen | 705/1 |
| 2002/0178016 A1 | 11/2002 | McLellan | |
| 2002/0178074 A1 | 11/2002 | Bloom | |
| 2002/0184497 A1 | 12/2002 | Gage et al. | |
| 2003/0040980 A1 | 2/2003 | Nakajima et al. | |
| 2003/0217018 A1 | 11/2003 | Groff et al. | |
| 2004/0015393 A1 | 1/2004 | Fong et al. | |
| 2004/0133446 A1 | 7/2004 | Myrick et al. | |
| 2004/0149822 A1 | 8/2004 | Stevens et al. | |
| 2004/0158351 A1 | 8/2004 | Rivalto | |
| 2004/0211834 A1 | 10/2004 | Fleckenstein et al. | |
| 2004/0254802 A1 | 12/2004 | Miller et al. | |
| 2005/0038758 A1 | 2/2005 | Hillbush et al. | |
| 2005/0061877 A1 | 3/2005 | Stevens | |
| 2005/0075989 A1 | 4/2005 | Biasi et al. | |
| 2005/0114221 A1 | 5/2005 | Walters et al. | |
| 2005/0131774 A1 | 6/2005 | Huxter | |
| 2005/0139650 A1 * | 6/2005 | Gonzalo | 235/380 |
| 2006/0020489 A1 | 1/2006 | Rivalto | |
| 2006/0089883 A1 | 4/2006 | Peoples | |
| 2006/0163345 A1 * | 7/2006 | Myers et al. | 235/380 |
| 2006/0195364 A1 | 8/2006 | Shroff et al. | |
| 2006/0287870 A1 | 12/2006 | Mayer et al. | |
| 2007/0011099 A1 * | 1/2007 | Sheehan | 705/65 |
| 2007/0067249 A1 | 3/2007 | Chatte | |
| 2007/0078795 A1 | 4/2007 | Chatte | |
| 2007/0174217 A1 | 7/2007 | Chatte | |
| 2007/0192191 A1 | 8/2007 | Neal et al. | |
| 2007/0203836 A1 | 8/2007 | Dodin | |
| 2008/0004967 A1 | 1/2008 | Gillen | |
| 2008/0085698 A1 * | 4/2008 | Gamm | 455/414.1 |
| 2008/0121682 A1 | 5/2008 | Grim et al. | |
| 2008/0299970 A1 * | 12/2008 | Roberts | 455/435.1 |
| 2008/0313079 A1 * | 12/2008 | Van Bosch et al. | 705/44 |
| 2009/0069040 A1 | 3/2009 | Wiesmuller | |
| 2009/0132438 A1 | 5/2009 | Dunmire et al. | |
| 2009/0314835 A1 * | 12/2009 | Jackson | 235/384 |
| 2010/0004960 A1 | 1/2010 | Frankenberg et al. | |
| 2010/0076869 A1 | 3/2010 | Shroff | |
| 2010/0293065 A1 | 11/2010 | Brody et al. | |
| 2011/0270714 A1 | 11/2011 | Myrick et al. | |

OTHER PUBLICATIONS

*Payment News, The ICBC Mobile Payment American Express Card in China,* www.paymentsnews.com/2009/11/the-icbc-mobile-payment-american-express-card-in-china.html, Jun. 17, 2010.
Mail & Go Postal Kiosk, Pitney Bowes, www.pb.com/equipment/Postage-meters-and-Scales/Postal-Kiosks/Postal-Kiosk.shtml, Jun. 17, 2010.
International Search Report and Written Opinion from International Application No. PCT/US11/26769 dated Mar. 2, 2011.
Office Action for U.S. Appl. No. 12/813,096, dated May 8, 2012.
European Patent Office, Extended European Search Report for Application No. 11714145.7, Mar. 27, 2014, 7 pages, Germany.
International Preliminary Examining Authority, International Preliminary Report on Patentability for International Application No. PCT/US2011/26769, completed May 1, 2012, 13 pages, United States Patent and Trademakr Office, USA.
United States Patent and Trademark Office, Office Action for U.S. Appl. No. 12/813,096, Aug. 4, 2014, 20 pages, USA.
United States Patent and Trademark Office, Office Action for U.S. Appl. No. 12/813,096, Jan. 7, 2015, 18 pages, USA.

* cited by examiner

ENHANCED PAYMENTS FOR SHIPPING

CROSS-REFERENCE TO RELATED APPLICATIONS

This application is a continuation application of U.S. application Ser. No. 12/813,096, filed Jun. 10, 2010, which is hereby incorporated herein in its entirety by reference.

BACKGROUND

With an ever-increasing desire for customer-friendly shipping options, a need exits for a solution that allows customers to pay for shipping services using a mobile device.

BRIEF SUMMARY

In general, embodiments of the present invention provide systems, methods, apparatus, and computer program products for the shipment of parcels.

In accordance with one aspect, a method for shipping a parcel is provided. In one embodiment, the method comprises (1) receiving a first message transmitted from a user device requesting shipment of a parcel; (2) in response to receiving the first message, identifying an account identifier based at least in part on the first message, wherein the account identifier corresponds to an account associated with a user of the user device; (3) determining whether the account is valid; and (4) in response to a determination that the account is valid, generating and transmitting a second message to the user device, wherein the second message comprises an authorization code. In one embodiment, the method may also comprise (5) receiving shipping information that is generated as the parcel is transported within a carrier's transportation and logistics network, wherein the shipping information comprises a tracking identifier and the authorization code; (6) in response to receiving the shipping information, determining whether the parcel is approved for shipment based at least in part on the authorization code; (7) in response to a determination that the parcel is approved for shipment, storing at least a portion of the shipment information in association with the tracking identifier, the authorization code, and the account identifier; (8) electronically determining shipping charges for shipment of the parcel; and (9) electronically charging the shipping charges to the account.

In accordance with another aspect, another method for shipping a parcel is provided. In one embodiment, the method comprises (1) receiving a first message transmitted from a user device requesting shipment of a parcel; (2) in response to receiving the first message, identifying an account identifier based at least in part on the first message, wherein the account identifier corresponds to an account associated with a user of the user device; and (3) determining whether the account is valid. In one embodiment, the method also comprises (4) in response to a determination that the account is valid, generating and transmitting a second message to the user device, wherein the second message comprises an authorization code; (5) receiving shipping information that is generated as the parcel is transported within a carrier's transportation and logistics network, wherein the shipping information comprises a tracking identifier and the authorization code; and (6) electronically charging shipping charges to the account.

In accordance with yet another aspect, a computer program product for shipping a parcel is provided. The computer program product may comprise at least one computer-readable storage medium having computer-readable program code portions stored therein, the computer-readable program code portions comprising executable portions configured to (1) receive a first message transmitted from a user device requesting shipment of a parcel; (2) in response to receiving the first message, identify an account identifier based at least in part on the first message, wherein the account identifier corresponds to an account associated with a user of the user device; (3) determine whether the account is valid; and (4) in response to a determination that the account is valid, generate and transmit a second message to the user device, wherein the second message comprises an authorization code. The computer-readable program code portions may also comprise executable portions configured to (5) receive shipping information that is generated as the parcel is transported within a carrier's transportation and logistics network, wherein the shipping information comprises a tracking identifier and the authorization code; (6) in response to receiving the shipping information, determine whether the parcel is approved for shipment based at least in part on the authorization code; (7) in response to a determination that the parcel is approved for shipment, store at least a portion of the shipment information in association with the tracking identifier, the authorization code, and the account identifier; (8) determine shipping charges for shipment of the parcel; and (9) charge the shipping charges to the account.

In accordance with still another aspect, a computer program product for shipping a parcel is provided. The computer program product may comprise at least one computer-readable storage medium having computer-readable program code portions stored therein, the computer-readable program code portions comprising executable portions configured to (1) receive a first message transmitted from a user device requesting shipment of a parcel; (2) in response to receiving the first message, identify an account identifier based at least in part on the first message, wherein the account identifier corresponds to an account associated with a user of the user device; and (3) determine whether the account is valid. The computer-readable program code portions may also comprise executable portions configured to (4) in response to a determination that the account is valid, generate and transmit a second message to the user device, wherein the second message comprises an authorization code; (5) receive shipping information that is generated as the parcel is transported within a carrier's transportation and logistics network, wherein the shipping information comprises a tracking identifier and the authorization code; and (6) charge shipping charges to the account.

In accordance with another aspect, a method for shipping a parcel is provided. In one embodiment, the method comprises (1) receiving input from a user requesting shipment of a parcel; (2) causing display of a request for input identifying a method of payment for shipment of the parcel; (3) in response to causing display of the request for input of the method of payment for shipment of the parcel, receiving input (a) identifying an account for wireless services as the method of payment and (b) a phone number associated with the account for wireless services; and (4) determining whether the account for wireless services is valid. In one embodiment, the method also comprises (5) in response to a determination that the account for wireless services is valid, generating and transmitting a message to a mobile device associated with the phone number, wherein the message comprises an authorization code; (6) causing display of a request for input of the authorization code transmitted to the mobile device; and (7) receiving input from the user identifying the authorization code.

In accordance with another aspect, another method for shipping a parcel is provided. In one embodiment, the method comprises (1) receiving input from a user requesting shipment of a parcel; (2) causing display of a request for input identifying a method of payment for shipment of the parcel; (3) in response causing display of the request for input of the method of payment for shipment of the parcel, receiving input identifying an account for wireless services as the method of payment; (4) in response to receiving input identifying the account for wireless services as the method of payment, automatically initiating communication with a mobile device associated with the account for wireless services; and (5) determining whether the account for wireless services is valid.

In accordance with still another aspect, a computer program product for shipping a parcel is provided. The computer program product may comprise at least one computer-readable storage medium having computer-readable program code portions stored therein, the computer-readable program code portions comprising executable portions configured to (1) receive input from a user requesting shipment of a parcel; (2) cause display of a request for input identifying a method of payment for shipment of the parcel; (3) in response to causing display of the request for input of the method of payment for shipment of the parcel, receive input identifying (a) an account for wireless services as the method of payment and (b) a phone number associated with the account for wireless services; and (4) determine whether the account for wireless services is valid. The computer-readable program code portions may also comprise executable portions configured to (5) in response to a determination that the account for wireless services is valid, generate and transmit a message to a mobile device associated with the phone number, wherein the message comprises an authorization code; (6) cause display of a request for input of the authorization code transmitted to the mobile device; and (7) receive input from the user identifying the authorization code.

In accordance with yet another aspect, another computer program product for shipping a parcel is provided. The computer program product may comprise at least one computer-readable storage medium having computer-readable program code portions stored therein, the computer-readable program code portions comprising executable portions configured to (1) receive input from a user requesting shipment of a parcel; (2) cause display of a request for input identifying a method of payment for shipment of the parcel; (3) in response causing display of the request for input of the method of payment for shipment of the parcel, receive input identifying an account for wireless services as the method of payment; (4) in response to receiving input identifying the account for wireless services as the method of payment, automatically initiate communication with a mobile device associated with the account for wireless services; and (5) determine whether the account for wireless services is valid.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
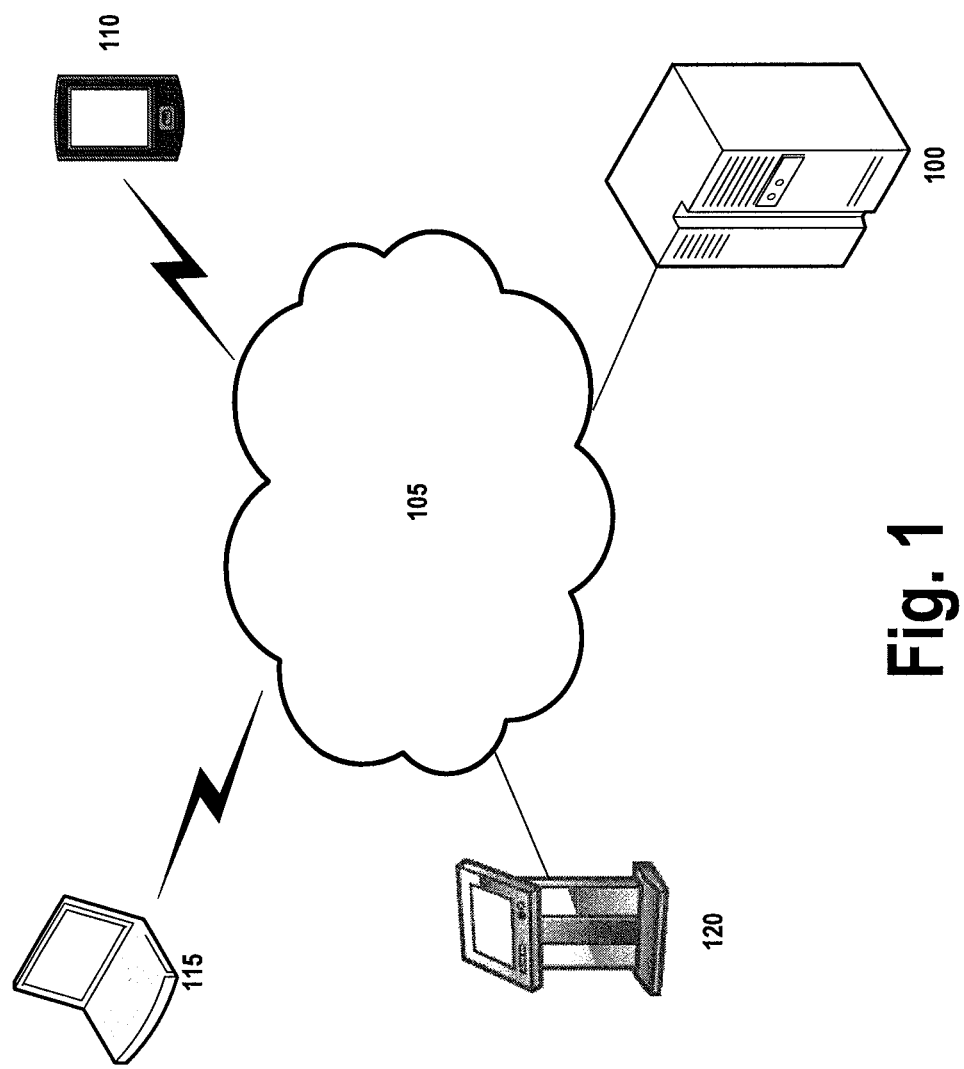
FIG. 1 is an overview of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that can be used in conjunction with various embodiments of the present invention. As shown in FIG. 1, the system may include one or more carrier systems 100, one or more networks 105, one or more mobile devices 110, one or more user computing devices 115, and one or more kiosks 120. Each of the components of the system may be in electronic communication with, for example, one another over the same or different wireless or wired networks including, for example, a wired or wireless Personal Area Network ("PAN"), Local Area Network ("LAN"), Metropolitan Area Network ("MAN"), Wide Area Network ("WAN"), or the like. Additionally, while FIG. 1 illustrates certain system entities as separate, standalone entities, the various embodiments are not limited to this particular architecture.

1. Exemplary Carrier System

Figure 2:
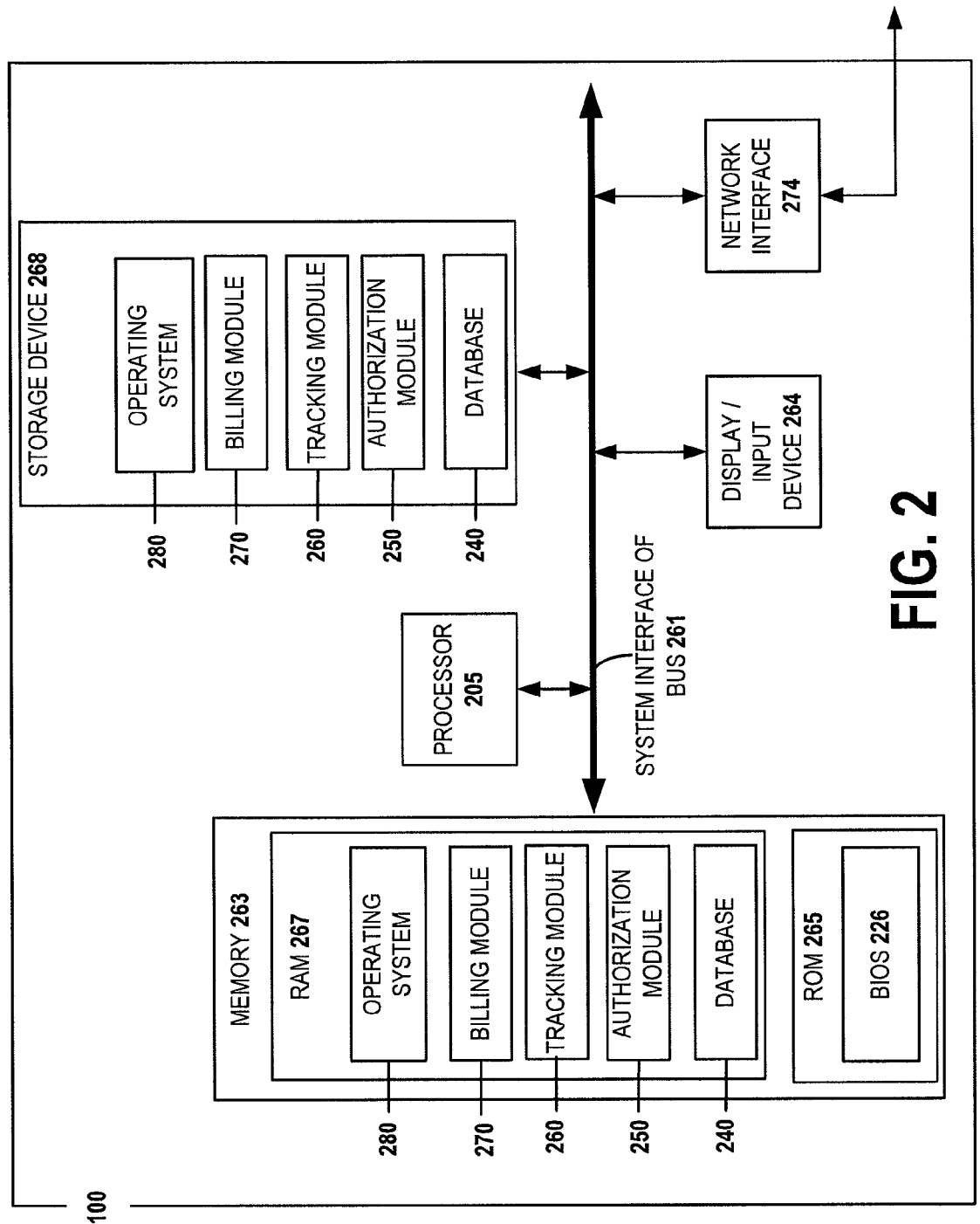
FIG. 2 is an exemplary schematic diagram of a carrier system according to one embodiment of the present invention.

FIG. 2 provides a schematic of a carrier system 100 according to one embodiment of the present invention. In general, the term "system" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the carrier system 100 includes a processor 205 that communicates with other elements within the carrier system 100 via a system interface or bus 261. The processor 205 may be embodied in a number of different ways. For example, the processor 205 may be embodied as a processing element, a coprocessor, a controller or various other processing devices including integrated circuits such as, for example, an application specific integrated circuit ("ASIC"), a field programmable gate array ("FPGA"), a hardware accelerator, or the like.

In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the carrier system 100. This display device/input device 264 may be, for example, a keyboard or pointing device that is used in combination with a monitor. The carrier system 100 further includes memory 263, which may include both read only memory ("ROM") 265 and random access memory ("RAM") 267. The carrier system's ROM 265 may be used to store a basic input/output system ("BIOS") 226 containing the basic routines that help to transfer information to the different elements within the carrier system 100.

In addition, in one embodiment, the carrier system 100 includes at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 268 may be connected to the system bus 261 by an appropriate interface.

Furthermore, a number of program modules may be stored by the various storage devices 268 and/or within RAM 267. Such program modules may include an operating system 280, a billing module 270, a tracking module 260, and an authorization module 250. These modules may control certain aspects of the operation of the carrier system 100 with the assistance of the processor 205 and operating system 280—although their functionality need not be modularized. In addition to the program modules, the carrier system 100 may store or be connected to one or more databases (e.g., database 240) with one or more tables stored therein.

Also located within the carrier system 100, in one embodiment, is a network interface 274 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the carrier system 100 may be configured to communicate via wireless external communication networks using any of a variety of protocols, such as 802.11, general packet radio service ("GPRS"), wideband code division multiple access ("W-CDMA"), or any other wireless protocol. Via the network interface 274, the carrier system 100 may be capable of sending and receiving text messages and/or instant messages.

It will be appreciated that one or more of the carrier system's 100 components may be located remotely from other carrier system 100 components. Furthermore, one or more of the components may be combined and additional components performing functions described herein may be included in the carrier system 100.

2. Exemplary Mobile Device

Figure 3:
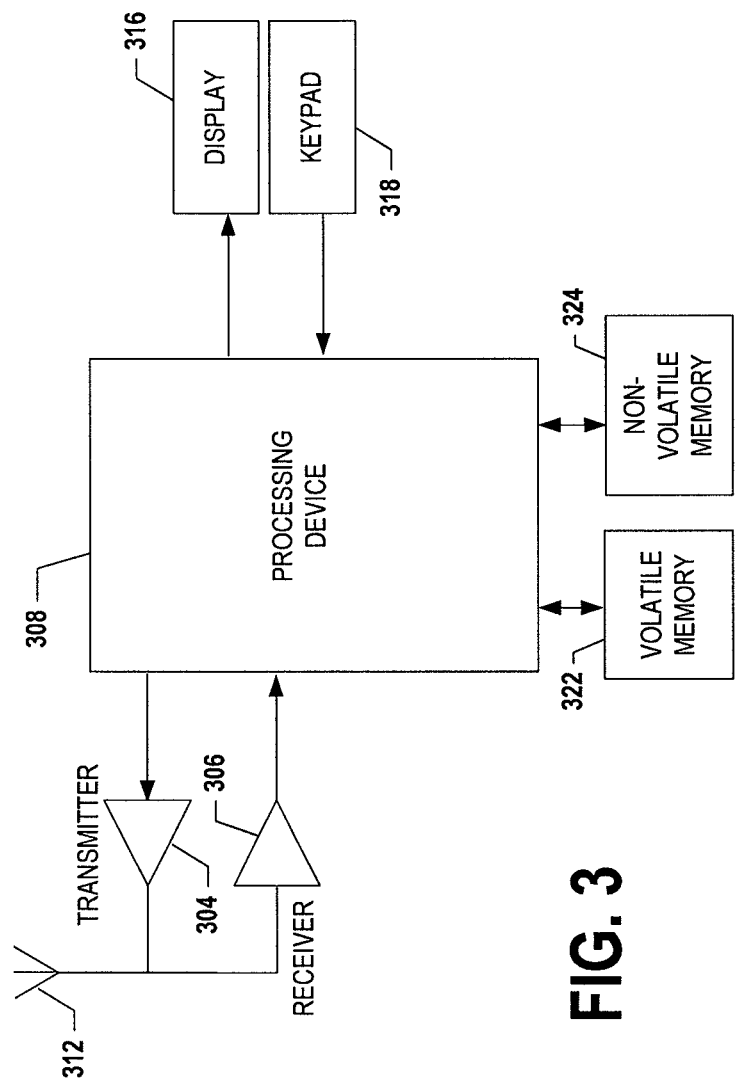
FIG. 3 is an exemplary schematic diagram of a mobile device according to one embodiment of the present invention.

FIG. 3 provides an illustrative schematic representative of a mobile device 110 that can be used in conjunction with the embodiments of the present invention. As shown in FIG. 3, the mobile device 110 can include an antenna 312, a transmitter 304, a receiver 306, and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the mobile device 110 may be capable of operating with one or more air interface standards, communication protocols, modulation types, and access types. More particularly, the mobile device 110 may operate in accordance with any of a number of second-generation ("2G") communication protocols, third-generation ("3G") communication protocols, fourth-generation ("4G") communication protocols, and/or the like. Further, for example, the mobile device 110 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the mobile device 110 can communicate with the carrier system 100 and/or various other entities (e.g., user computing devices 110 or telephones 120). The mobile device 110 can also download changes, add-ons, and updates, for instance, to its firmware, software (e.g., including modules), and operating system.

The mobile device 110 may also comprise a user interface (that can include a display 316 coupled to a processing device 308) and/or a user input interface (coupled to the processing device 308). The user input interface can comprise any of a number of devices allowing the mobile device 110 to receive data, such as a keypad 318, a touch display, voice or motion interfaces, or other input device. In embodiments including a keypad 318, the keypad 318 can include the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Although not shown, the mobile device 110 may also include a battery, such as a vibrating battery pack, for powering the various circuits that are required to operate the mobile device 110, as well as optionally providing mechanical vibration as a detectable output.

The mobile device 110 can also include volatile memory 322 and/or non-volatile memory 324, which can be embedded and/or may be removable. For example, the non-volatile memory may be embedded or removable multimedia memory cards ("MMCs"), secure digital ("SD") memory cards, Memory Sticks, EEPROM, flash memory, hard disk, or the like. The memory can store any of a number of pieces or amount of information and data used by the mobile device 110 to implement the functions of the mobile device 110. The memory can also store content, such as computer program code for an application and/or other computer programs.

3. Exemplary Kiosk

As shown in FIG. 1, the system may include a kiosk 120. The kiosk 120 may include one or more components that are functionally similar to those of the carrier system 100. For example, a kiosk 120 may include: (1) a processor that communicates with elements via a system interface or bus; (2) a display device/input device; (3) memory including both ROM and RAM; (4) a storage device; (5) a network interface (including near field communication capabilities such as Bluetooth and capabilities for sending and receiving text messages and/or instant messages); (6) weighing mechanisms, such as scales; and/or (7) imaging devices. These architectures are provided for exemplary purposes only and are not limiting to the various embodiments.

4. Additional Exemplary System Components

The user computing devices 115 may each include one or more components that are functionally similar to those of the carrier system 100. For example, in one embodiment, each user computing device 115 may include: (1) a processor that communicates with other elements via a system interface or bus; (2) a display device/input device; (3) memory including both ROM and RAM; (4) a storage device; and (5) a network interface. These architectures are provided for exemplary purposes only and are not limiting to the various embodiments. The term "computing device" is used generically to refer to any computer, mobile phone, computing device, desktop, notebook or laptop, distributed system, server, gateway, switch, or other processing device adapted to perform the functions described herein.

III. Exemplary System Operation

Figure 4:
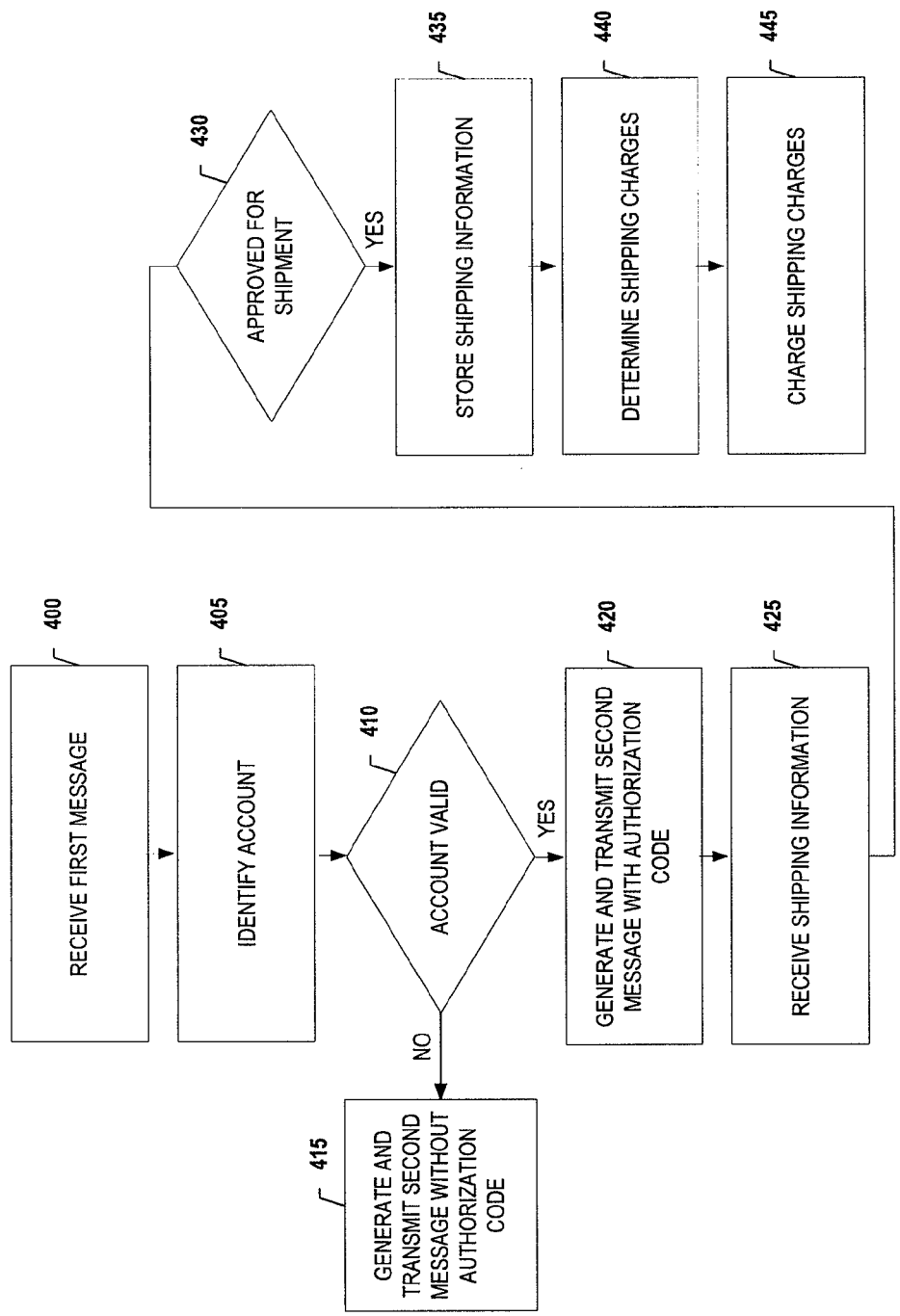
FIGS. 4-5 are flowcharts illustrating operations and processes that can be used in accordance with various embodiments of the present invention.
Figure 5:
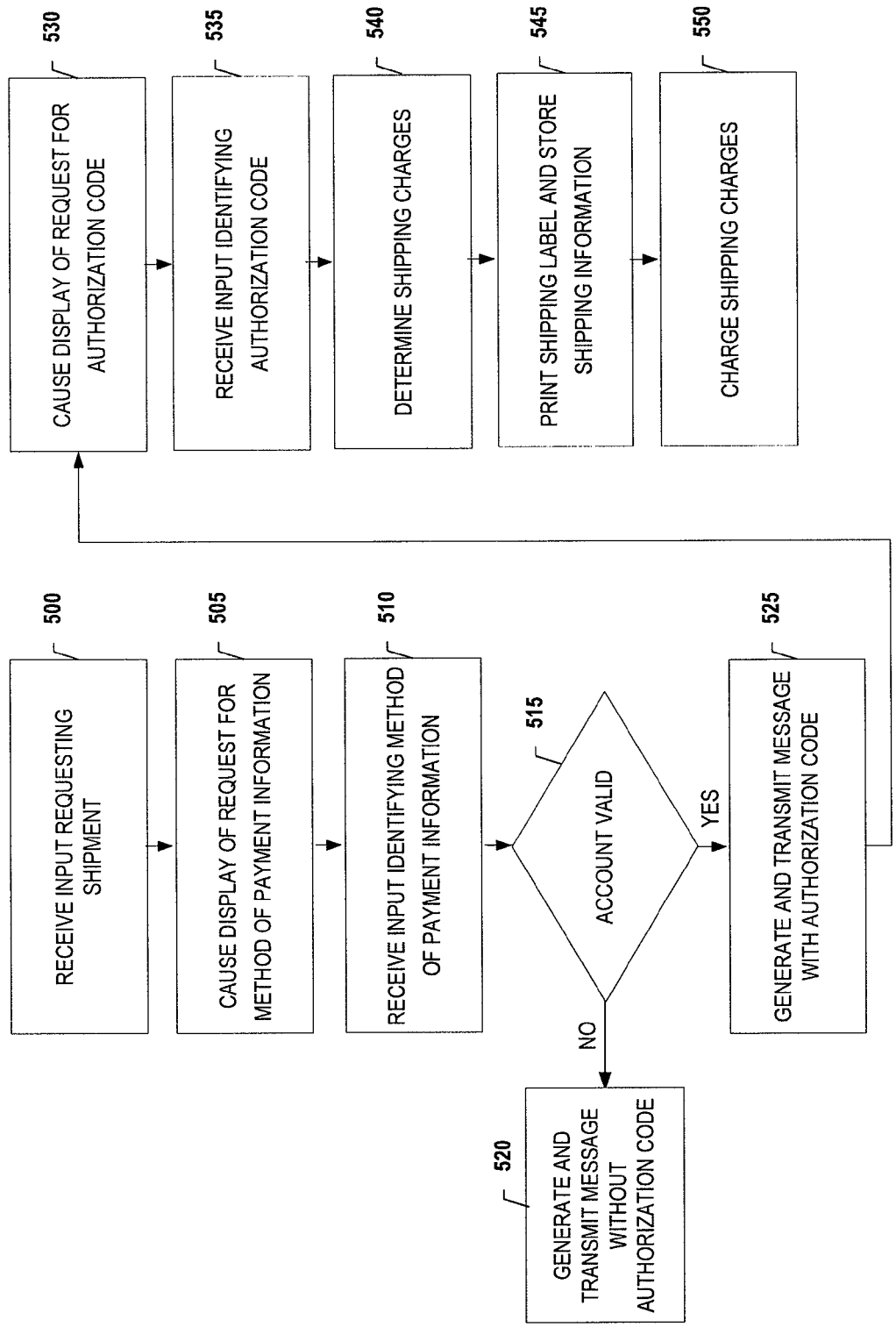
Figure 6:
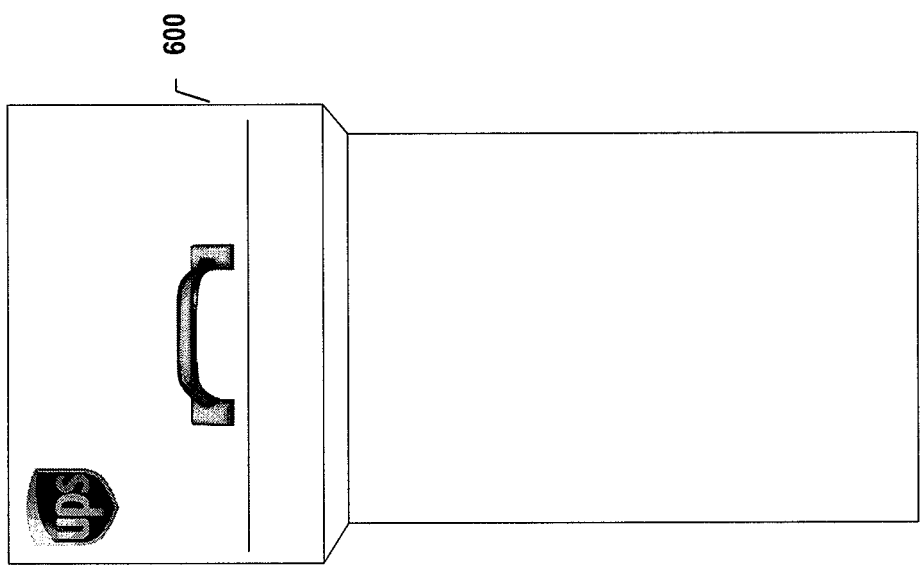
FIG. 6 is an exemplary drop-box according to one embodiment of the present invention.
Figure 7:
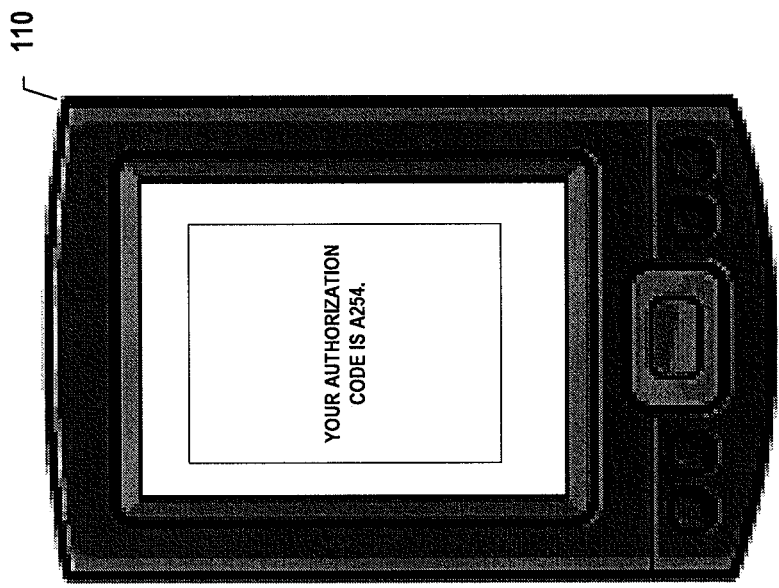
FIG. 7 shows exemplary input/output that can be produced via a mobile device according to one embodiment of the present invention.

Reference will now be made to FIGS. 4-7. FIGS. 4-5 provide flowcharts illustrating operations that may be performed for shipping parcels. FIG. 6 is an exemplary drop-box 600 at which parcels can be dropped off for a carrier (e.g., United Parcel Service of America, Inc.). And FIG. 7 shows exemplary input/output that can be produced via a mobile device 110.

1. Message-Based Shipments

In one embodiment, customers/users can use electronic messages to initiate shipment of and payment for shipping a parcel.

a. Initiation of Shipment

In one embodiment, a customer/user can use, for example, a drop-box 600 (such as the one shown in FIG. 6) to initiate shipment of a parcel (e.g., envelope, bag, package, bundled item, box with information pre-printed thereon, and/or the like) by a carrier (e.g., United Parcel Service of America, Inc.). For instance, the user can retrieve a shipping form (or a box or envelope with information pre-printed thereon) that may be stored proximate the drop-box 600 (or other shipping location) and fill out the shipping form (or box or envelope with information pre-printed thereon) with shipping information. The shipping information may include information such as (a) the consignor's name, address, phone number, and charge card number (or a portion thereof), (b) the contents, weight, and dimensions of the parcel, (c) the consignee's name, address, and phone number, (d) the class of service of the parcel (e.g., Ground, Next Day Air, etc.), and/or (e) a variety of other information. The shipping form (or box or envelope with information pre-printed thereon) may also include a unique, pre-printed tracking number. The tracking number may be, for example, a progressive number ("PRO number"), a purchase order number, and/or a set of alphanumeric characters (e.g., "1Z23456789"). The tracking number may be used by the carrier to identify and track the parcel as it travels through the carrier's transportation and logistics network. To that end, the shipping form may have a self-adhesive portion, for example, that can be used to adhere the shipping form to the parcel or adhere a label portion of the shipping form to the parcel.

As shown in FIG. 4, in one embodiment, after (or in some cases before) filing out the shipping form (or box or envelope with information pre-printed thereon), the customer/user can initiate shipment of the parcel with carrier. To do so, the customer/user may send a message (e.g., a first message) via a user device (e.g., a mobile device 110 or a user computing device 115) to the carrier. For example, the shipping form, drop-box 600, box, or envelope may indicate that to initiate shipment of a parcel, a text message should be sent to 555-555-5555 with the tracking number printed on the shipping form as the body of the message. Thus, in one embodiment, the customer/user (e.g., via operation of user device such as a mobile device 110 or user computing device 115) sends a text message to 555-555-5555 with 1Z23456789 as the body of the message. As will be recognized, though, the message may be any type of message, such as a text message, an instant message, an email message, and/or the like. Similarly, the message may include a variety of shipping information, such as the pre-printed tracking number listed on the shipping form, a charge card number (or a portion thereof), and/or a carrier account number (or a portion thereof).

As indicated in Block 400, in one embodiment, a carrier entity (e.g., a carrier system 100) can receive the first message (e.g., text message) sent from the user device (e.g., mobile device 110 or user computing device 115) requesting shipment of the parcel. In response to receiving the first message, the carrier system 100, for example, can identify an account identifier based at least in part on the first message. In one embodiment, the account identifier may correspond to an account associated with the customer/user (Block 405). The account identifier may be, for example, a phone number of the mobile device 110 from which the first message originates, the phone number associated with an application executing on a user computing device 115 from which the first message originates, a credit card number (or a portion thereof) within the body of the first message, and/or a carrier account number (or a portion thereof) within the body of the first message. Accordingly, the account corresponding to the account identifier may be (a) an account for wireless services (e.g., phone and/or data services), (b) an account for a charge card, (c) a shipping account with the carrier, and/or (d) a variety of other accounts.

As shown in Block 410, after identifying the account identifier, the carrier system 100 can determine whether the account is valid. Determining whether the account is valid may include a variety of techniques and/or approaches. For example, in one embodiment, the carrier system 100 determines whether the account associated with the phone number is valid by electronically communicating with the wireless services provider to determine whether the account is active, in good standing, and/or available for mobile payments. For instance, a phone number in a family plan may be blocked for mobile payments via parental controls provided by the wireless services provider. Similarly, the wireless services provider may block messages to certain prefixes, such as 900 numbers. In another embodiment, the carrier system 100 may determine whether the carrier has "blacklisted" the phone number, for example, corresponding to the account. In another embodiment, the carrier system 100 may determine whether the account corresponding to the charge card number is valid by determining whether the charge card account is active and in good standing.

In addition to the determining whether the account is valid, the carrier system 100 (e.g., via the authorization module 250) can execute various other validation/confirmation techniques and/or approaches. For example, the carrier system 100 can determine whether the tracking number in the body of the first message has been used previously. Or, the carrier system 100 can access (a) the transaction history of the customer's/user's interactions with the carrier and/or (b) any customer/user configured parameters. For example, a customer/user can register mobile phone numbers with carrier (e.g., via the carrier's website) to configure usage parameters. The usage parameters may, for example, (a) limit a phone number to one shipment per day, (b) not allow for international shipments using the phone number, and/or (c) limit the mobile payments for shipping to $100 per day. As will be recognized, a variety of approaches and/or techniques may be used.

In one embodiment, as indicated in Block 415, in response to a determination that the account is invalid, the carrier system 100 (e.g., via the authorization module 250) can generate and transmit a message (e.g., a second message) to the user device (e.g., mobile device 110 or user computing device 115). As with the first message, the second message may be any type of message, such as a text message, an instant message, an email message, and/or the like. In an embodiment in which the account is invalid, the second message may indicate that the customer/user cannot use the selected method of payment for shipping the parcel.

In one embodiment, as indicated in Block 420, in response to a determination that the account is valid, the carrier system 100 can generate and transmit a message (e.g., a second message) to the user device (e.g., mobile device 110 or user computing device 115). As indicated, the second message may be any type of message, such as a text message, an instant message, an email message, and/or the like. In an embodiment in which the account is valid, the second message may comprise an authorization code for shipment of the parcel. The authorization code may be, for example, an alphanumeric code (e.g., "A254") that has been correlated with the tracking number and/or the shipping information provided by the customer/user.

In one embodiment, the authorization code may also be associated with various predefined parameters. For example, the authorization code may be associated with predefined parameters that define (a) a time period in which the authorization code is valid and/or (b) the number of times the authorization code can be used for shipments. For instance, the authorization code may only be valid for a single shipment. Similarly, the authorization code may be valid for a certain period of time (e.g., 7 days) after issuance. As will be recognized, a variety of other approaches and techniques may be used.

In one embodiment, after the user device (e.g., mobile device 110 or user computing device 115) receives the second message, the user device (e.g., mobile device 110 or user computing device 115) can cause display of the second message to the customer/user, as shown in FIG. 7. The customer/user can write the authorization code on the parcel, label, or shipping form, for example. The customer/user can then deliver the parcel to a drop-box 600 or other carrier location/facility. Alternatively, the customer/user may request that a carrier vehicle be dispatched to pick up the parcel from the customer/user. Upon receipt of the parcel, the carrier can use the shipping information and/or authorization code in transporting the parcel through the carrier's transportation and logistics network.

b. Shipment

In one embodiment, after the carrier receives the parcel from the customer/user (consignee), the carrier can begin transport of the parcel through the carrier's transportation and logistics network. Parcels moving through the carrier's transportation and logistics network are typically tracked by scanning a label (e.g., barcode, radio frequency identification ("RFID") tag, etc.), shipping form, or other indicia associated with the parcel at one or more scan points. For example, at a transportation hub, one or more scanning devices may be used to scan a label associated with the parcel (or box or envelope) to capture shipping information from the parcel. Additionally or alternatively, an image of the label on the parcel, for instance, may be captured by one or more imaging devices. As with scanning the parcel, the image of the label on the parcel may comprise shipping information (such as the tracking identifier and/or the authorization code) that may be human readable and/or machine readable.

In one embodiment, the image of the parcel can then be transmitted to and received by the carrier system 100 (Block 425). The carrier system 100 can then receive/identify shipping information contained in the image. The carrier system 100 (e.g., via the tracking module 260) can receive/identify the shipping information using a variety of techniques and approaches. For example, a user (e.g., a carrier employee) can read the shipping information from the image and input the same via an interface into the carrier system 100. In another embodiment, an optical character recognition ("OCR") feature can be used to extract the shipping information from the image. As will be recognized, a variety of other techniques and approaches can be used.

As a result of receiving/identifying the shipping information as the parcel is transported within a carrier's transportation and logistics network, the carrier system 100 can determine whether the parcel is approved for shipment (Block 430). In determining whether the parcel is approved for shipment, the carrier system 100 can, for example, determine whether the authorization code used to ship the parcel is valid. The carrier system 100 may also determine whether the authorization code and/or parcel are in compliance with any predefined parameters associated with the authorization code (e.g., time period or usage parameters). Determining whether the parcel is approved for shipment may also include determining whether the account is still valid. As discussed above, this may include electronically communicating with the wireless services provider or charge card company to determine whether (a) the account associated with the phone number is still active, in good standing, and/or available for mobile payments and/or (b) the account corresponding to the charge card is still active and in good standing. Similarly, this may include determining, for example, whether the carrier has blacklisted the phone number corresponding to the account.

In one embodiment, in response to a determination that the parcel is approved for shipment, the carrier system 100 can store the shipment information in association with the tracking identifier, the authorization code, and/or the account identifier (Block 435). In one embodiment, this may include automatically creating a parcel level detail ("PLD") record. The PLD record may include shipping information, such as the consignor's address, the consignor's mobile phone number, the authorization code, the tracking number, the consignee's address, the class of service, and/or the method of payment. As will be recognized, the storage of this information may occur at any point during the process, such as after receiving the first message transmitted from the user device.

In one embodiment, if the parcel is approved for shipment, the parcel continues to be transported through the carrier's transportation and logistics network to the consignee and/or destination address. If the parcel is not approved for shipment (e.g., the account associated with wireless phone number is not active and/or in good standing), the parcel can be held by the carrier or returned to the consignor. For example, a flag (e.g., an exception event) may be stored in the PLD record indicating that shipment of the parcel should be held or returned to the consignor. In the event the parcel is held by the carrier, carrier representative's can contact the consignor to receive an alternative means of payment for shipment of the parcel.

c. Payment for Shipment

In one embodiment, as the parcel is transported through the carrier's transportation and logistics network to the consignee and/or destination address, the shipping charges for shipment of the parcel may be automatically determined. For example, the parcel may pass through automatic scanners, imaging devices, scales, and/or the like within the carrier's transportation and logistics network. Thus, for instance, as the parcel passes over a scale, the weight of the parcel can automatically be determined. Additionally, imaging devices, such as digital cameras, can capture images of the parcel. The carrier system 100 can use the images of the parcel to, for example, determine the dimensions of the parcel. With the weight, dimensions, and class of service of the parcel, the carrier system 100 (e.g., via the billing module 270) can determine the appropriate shipping charges for shipment of the parcel (Block 440).

In one embodiment, after determining the shipping charges for the parcel, the carrier system 100 (e.g., via the billing module 270) can charge the appropriate account for shipment of the parcel (Block 445). As discussed above, the account may be (a) an account for wireless services (e.g., phone and/or data services), (b) an account for a charge card, (c) a shipping account with the carrier, and/or (d) a variety of other accounts. In one embodiment, the carrier system 100 (e.g., via the billing module 270) can charge (e.g., process) the shipping charges to accounts in batch, such as batch processing the transaction hourly or nightly. In another embodiment, the carrier system 100 (e.g., via the billing module 270) can charge the appropriate accounts in real time or near real time. Thus, after the carrier system 100 charges the appropriate account, the customer/user can be billed, for example, by his wireless services provider for the shipping charges at the end of his billing cycle. The wireless services provider can also settle the charges with the carrier.

In one embodiment, in addition to charging the appropriate account, the carrier system 100 may provide additional information (e.g., the tracking number and/or the authorization code) to the appropriate entity (e.g., wireless service provider, charge card company, etc.) when charging the account. This information may be included, for example, on the customer's/user's bill. For instance, the wireless services provider can use this additional information to provide the details of the shipment on the customer's/user's bill for wireless services.

d. Additional Concepts

As will be recognized, a variety of other approaches and techniques may be used. For example, in one embodiment, the carrier system 100 can store a charge card number in association with a phone number for the customer/user. Thus, the customer/user can provide a phone number as the account identifier in the first message, but the charge card account could be charged for the shipment of the parcel—instead of the account with the wireless services provider. Similarly, the carrier system 100 can store a carrier account number in association with a phone number. This may allow the customer/user to provide a phone number as the account identifier in the first message, but the carrier account could be charged for the shipment of the parcel—instead of the account with the wireless services provider.

2. Kiosk-Based Shipments

In one embodiment, a customer/user can use an apparatus, such as a kiosk 120, to initiate shipment of and payment for shipping a parcel.

a. Initiation of Shipment and Shipment

In one embodiment, a customer/user can use a kiosk 120, for example, to initiate shipment of a parcel (e.g., envelope, bag, package, bundled item, box with information pre-printed thereon, and/or the like) by a carrier. As indicated, the kiosk 120 may have key entry and display features that allow customers/users to interact with the kiosk 120. In one embodiment, the process beings with the kiosk 120 receiving input requesting shipment of a parcel, e.g., via a customer/user inputting information into the kiosk 120 (Block 500). In response to receiving this input, the kiosk 120 can cause display of a request for input of shipping information and/or a method of payment for shipping the parcel (Block 505). As discussed previously, the shipping information may include information such as (a) the consignor's name, address, phone number, and charge card number (or a portion thereof), (b) the contents, weight, and dimensions of the parcel, (c) the consignee's name, address, and phone number, (d) the class of service of the parcel (e.g., Ground, Next Day Air, etc.), and/or (e) a variety of other information. The payment options may include paying for the shipment via (a) a charge card, (b) an account for wireless services, (c) an account with the carrier, (d) a physical form of currency, and/or (e) the like. In one embodiment, in response to causing display of the request for the method of payment for shipment of the parcel, the kiosk 120 may receive input (a) indicating that the customer/user desires to pay for the shipment via an account for wireless services (Block 510) and (b) identifying a particular phone number associated with the account for wireless services.

In one embodiment, in response to receiving input indicating that the customer/user desires to pay for shipment via the account for wireless services and the corresponding phone number, the carrier system 100 can determine whether the account for wireless services is valid (Block 515). As discussed above, determining whether the account is valid may include a variety of techniques and/or approaches. For example, in one embodiment, the carrier system 100 determines whether the account associated with the phone number is valid by electronically communicating with the wireless services provider to determine whether the account is active, in good standing, and/or available for mobile payments. For instance, a phone number in a family plan may be blocked for mobile payments via parental controls provided by the wireless services provider. Similarly, the wireless services provider may block messages to certain prefixes, such as 900 numbers. In another embodiment, the carrier system 100 may determine whether the carrier has blacklisted the phone number, for example, corresponding to the account. In another embodiment, the carrier system 100 may determine whether the account corresponding to the charge card number is valid by determining whether the charge card account is active and in good standing.

In one embodiment, as indicated in Block 520, in response to a determination that the account is invalid, the kiosk 120/carrier system 100 (e.g., via the authorization module 250) can generate and transmit a message to the user device (e.g., mobile device 110 or user computing device 115). As discussed above, the message may be any type of message and indicate that the customer/user cannot use the selected method of payment for shipping the parcel.

In one embodiment, as indicated in Block 525, in response to a determination that the account is valid, the kiosk 120/carrier system 100 (e.g., via the authorization module 250) can generate and transmit a message comprising an authorization code to the user device. As discussed above, the message may be any type of message and include an authorization code. The authorization code may be, for example, an alphanumeric code (e.g., "A254") that has been correlated with the tracking number and/or the shipping information. The authorization code may also be associated with various predefined parameters. For example, the authorization code may be associated with predefined parameters that define (a) a time period in which the authorization code is valid and/or (b) the number of times the authorization code can be used for shipments. For instance, the authorization code may be valid for a single shipment or multiple shipments. Similarly, the authorization code may be valid for a certain period of time (e.g., 7 days) after issuance. As will be recognized, a variety of other approaches and techniques may be used.

In one embodiment, in addition to generating and transmitting a message to the user device (or an account, such as Gmail, Skype, etc.), the kiosk 120 can cause display of a request for input of the authorization code transmitted to the user device (Block 530). Thus, after the customer's/user's user device (e.g., mobile device 110) receives the message with the authorization code (e.g., see FIG. 7), the customer/user can input the authorization code into the kiosk 120 (Block 535).

In one embodiment, in response to receiving input of the correct authorization code, the kiosk 120 can cause display of additional requests for input, for example, to properly classify the parcel. For instance, the kiosk 120 can cause display of text instructing the customer/user to place the parcel on a scale proximate (or disposed on) the kiosk 120. By doing so, the kiosk 120 can determine the actual weight of the parcel. The kiosk 120 can also cause display of text instructing the customer/user to input (e.g., via key entry) the dimensions of the parcel. For example, the customer/user may input the dimension of the parcel in appropriate length, width, and height fields. As will be recognized, a variety of approaches and techniques may be used.

In one embodiment, after receiving the appropriate input (e.g., weight, dimensions, and class of service of the parcel), the kiosk 120 (or carrier system 100) can determine the appropriate shipping charges for shipment of the parcel (Block 540). For example, if a customer/user enters the dimensions of the parcel as 10×10×10 (e.g., length, width, and height) and the kiosk 120 determines the parcel weighs 2 pounds, the kiosk 120 may provide a notification to the customer/user that the parcel is classified as being a high volume, low weight parcel and cause display of the corresponding shipping charge. Additionally, the kiosk 120 may add a surcharge for certain destinations (e.g., rural areas) or contents (e.g., hazardous materials) of the parcel. As will be recognized, a variety of approaches and techniques may be used.

In addition to determining the shipping charges, the kiosk 120 (or carrier system 100) may store the shipping information associated with the parcel and/or the customer/user (Block 545). For example, the kiosk 120/carrier system 100 may create a PLD record to store the shipping information, such as the consignor's address, the consignor's mobile phone number, the authorization code, the consignee's address, tracking number, class of service, and/or method of payment.

In one embodiment, in addition to storing the shipping information, the kiosk 120 may automatically print a shipping label to be affixed to the parcel (Block 545). After the kiosk 120 prints the shipping label, the customer/user can adhere the shipping label to the parcel. The customer/user can then deliver the parcel to the kiosk 120, a drop-box 600, or other carrier location/facility. Upon receipt of the parcel, the carrier can transport the parcel through the carrier's transportation and logistics network to the consignee and/or destination address.

b. Payment for Shipment

In one embodiment, the kiosk 120/carrier system 100 (e.g., via the billing module 270) can charge the appropriate account for shipment of the parcel (Block 550). As discussed above, the account may be an account for wireless services (e.g., phone and/or data services) and/or a variety of other accounts as described above. Thus, the customer/user can be billed by his wireless services provider for the shipping charges at the end of his billing cycle. Correspondingly, the wireless services provider can then settle the shipping charges with the carrier.

In one embodiment, in addition to charging the appropriate account, the carrier system 100 may provide additional information (e.g., the tracking number and/or the authorization code) to the appropriate entity (e.g., wireless service provider, charge card company, etc.) when charging the account. This information may be included, for example, on the customer's/user's bill. For instance, the wireless services provider can use this additional information to provide the details of the shipment on the customer's/user's bill for wireless services.

c. Additional Concepts

As will be recognized, a variety of other approaches and techniques may be used. For example, in one embodiment, in response to a determination that the account is valid, the kiosk 120 may automatically initiate communication with a mobile device 110 associated with the account for wireless services. Thus, in lieu of sending a message with an authorization code to the user device (e.g., mobile device 110), the kiosk 120 can communicate via a communication standard/protocol (e.g., Bluetooth) to confirm that the customer/user is currently in possession of the user device.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for shipping a parcel, the method comprising:
receiving, via a kiosk, input from a user requesting shipment of a parcel;
causing, via the kiosk, display of a request for input identifying a method of payment for shipment of the parcel;
after causing display of the request for input of the method of payment for shipment of the parcel, receiving, via the kiosk, input (a) identifying an account for wireless services as the method of payment and (b) a phone number associated with the account for wireless services;
determining whether the account for wireless services is valid;
after a determination that the account for wireless services is valid, (a) providing a message to a mobile device associated with the phone number, wherein the message comprises an authorization code that authorizes shipment of the parcel, and (b) correlating the authorization code with a tracking number that is for tracking shipment of the parcel, and (c) storing the authorization code in association with the tracking number;
causing, via the kiosk, display of a request for input of the authorization code that authorizes shipment of the parcel provided to the mobile device; and
causing, via the kiosk, display of a request for input of the authorization code that authorizes shipment of the parcel provided to the mobile device;
receiving, via the kiosk, input from the user identifying the authorization code that authorizes shipment of the parcel provided to the mobile device;
after receiving input identifying the authorization code, automatically (a) printing a shipping label to be affixed to the parcel and (b) storing the authorization code in association with the phone number, and shipment information;
determining shipping charges for shipment of the parcel; and
charging the shipping charges to the account,
wherein determining the shipping charges for shipment of the parcel further comprises automatically determining a weight of the parcel.

2. The method of claim 1, wherein the authorization code is associated with predefined parameters.

3. The method of claim 2, wherein the predefined parameters define (a) a time period in which the authorization code is valid and (b) the number of times the authorization code can be used for shipments.

4. The method of claim 1, wherein the message is selected from the group consisting of a text message and an instant message.

5. A method for shipping a parcel, the method comprising:
receiving, via a kiosk, input from a user requesting shipment of a parcel;
causing, via the kiosk, display of a request for input identifying a method of payment for shipment of the parcel;
after causing display of the request for input of the method of payment for shipment of the parcel, receiving, via the kiosk, input identifying an account for wireless services as the method of payment;
after receiving input identifying the account for wireless services as the method of payment, automatically initiating, via the kiosk, near-field communication with a mobile device associated with the account for wireless services to (a) confirm that the user is in possession of the mobile device associated with the account for wireless services and (b)
authorize shipment of the parcel;
determining whether the account for wireless services is valid;
after a determination that the account for wireless services is valid, automatically (a) printing a shipping label to be affixed to the parcel and (b) storing the authorization code in association with the phone number, a tracking number, and shipment information;
determining shipping charges for shipment of the parcel; and
charging the shipping charges to the account,
wherein determining the shipping charges for shipment of the parcel further comprises automatically determining a weight of the parcel.

6. The method of claim 5, wherein the authorization code is associated with predefined parameters.

7. The method of claim 6, wherein the predefined parameters define (a) a time period in which the authorization code is valid and (b) the number of times the authorization code can be used for shipments.

8. The method of claim 5, wherein the message is selected from the group consisting of a text message and an instant message.

9. A computer program product for shipping a parcel executing a kiosk, the computer program product comprising at least one non-transitory computer-readable storage medium having computer-readable program code portions stored therein, the computer-readable program code portions comprising:
an executable portion configured to receive input from a user requesting shipment of a parcel;
an executable portion configured to cause display of a request for input identifying a method of payment for shipment of the parcel;
an executable portion configured to, after causing display of the request for input of the method of payment for shipment of the parcel, receive input identifying (a) an account for wireless services as the method of payment and (b) a phone number associated with the account for wireless services;
an executable portion configured to determine whether the account for wireless services is valid;
an executable portion configured to, after a determination that the account for wireless services is valid, (a) provide a message to a mobile device associated with the phone number, wherein the message comprises an authorization code that authorizes shipment of the parcel, and (b) correlating the authorization code with a tracking number that is for tracking shipment of the parcel, and (c) storing the authorization code in association with the tracking number;

an executable portion configured to cause display of a request for input of the authorization code that authorizes shipment of the parcel provided to the mobile device;

an executable portion configured to receive input from the user identifying the authorization code that authorizes shipment of the parcel provided to the mobile device;

an executable portion configured to, after receiving input identifying the authorization code, automatically (a) print a shipping label to be affixed to the parcel and (b) store the authorization code in association with the phone number, and shipment information;

an executable portion configured to determine shipping charges for shipment of the parcel; and an executable portion configured to charge the shipping charges to the account, wherein the executable portion configured to determine the shipping charges for shipment of the parcel is further configured to automatically determine a weight of the parcel.

10. The computer program product of claim 9, wherein the authorization code is associated with predefined parameters.

11. The computer program product of claim 10, wherein the predefined parameters define (a) a time period in which the authorization code is valid and (b) the number of times the authorization code can be used for shipments.

12. The computer program product of claim 9, wherein the message is selected from the group consisting of a text message and an instant message.

13. A computer program product for shipping a parcel executing a kiosk, the computer program product comprising at least one non-transitory computer-readable storage medium having computer-readable program code portions stored therein, the computer-readable program code portions comprising:

an executable portion configured to receive input from a user requesting shipment of a parcel;

an executable portion configured to cause display of a request for input identifying a method of payment for shipment of the parcel;

an executable portion configured to, after causing display of the request for input of the method of payment for shipment of the parcel, receive input identifying an account for wireless services as the method of payment;

an executable portion configured to, after receiving input identifying the account for wireless services as the method of payment, automatically initiate near-field communication with a mobile device associated with the account for wireless services to (a) confirm that the user is in possession of the mobile device associated with the account for wireless services and (b) authorize shipment of the parcel;

an executable portion configured to determine whether the account for wireless services is valid;

an executable portion configured to, after a determination that the account for wireless services is valid, automatically (a) print a shipping label to be affixed to the parcel and (b) store the authorization code in association with the phone number, a tracking number, and shipment information;

an executable portion configured to determine shipping charges for shipment of the parcel; and an executable portion configured to charge the shipping charges to the account, wherein electronically determining the shipping charges for shipment of the parcel further comprises automatically determining a weight of the parcel.

14. The computer program product of claim 13, wherein the authorization code is associated with predefined parameters.

15. The computer program product of claim 14, wherein the predefined parameters define (a) a time period in which the authorization code is valid and (b) the number of times the authorization code can be used for shipments.

16. The computer program product of claim 13, wherein the message is selected from the group consisting of a text message and an instant message.

* * * * *

UNITED STATES PATENT AND TRADEMARK OFFICE
CERTIFICATE OF CORRECTION

Page 1 of 1

PATENT NO.           : 9,082,096 B2
APPLICATION NO.      : 12/813998
DATED                : July 14, 2015
INVENTOR(S)          : Parameswwaran et al.

It is certified that error appears in the above-identified patent and that said Letters Patent is hereby corrected as shown below:

In The Claims

Column 15

Lines 42-44, delete "causing, via the kiosk, display of a request for input of the authorization code that authorizes shipment of the parcel provided to the mobile device; and"

Signed and Sealed this
Fifth Day of January, 2016

Michelle K. Lee
*Director of the United States Patent and Trademark Office*